(12) United States Patent
Kurotobi et al.

(10) Patent No.: US 12,448,083 B2
(45) Date of Patent: Oct. 21, 2025

(54) CONTROL DEVICE AND CONTROL SYSTEM FOR HUMAN-POWERED VEHICLE

(71) Applicant: Shimano Inc., Osaka (JP)

(72) Inventors: Tadaharu Kurotobi, Osaka (JP); Koji Yuasa, Osaka (JP); Satoshi Idogaki, Osaka (JP)

(73) Assignee: Shimano Inc., Osaka (JP)

( * ) Notice: Subject to any disclaimer, the term of this patent is extended or adjusted under 35 U.S.C. 154(b) by 6 days.

(21) Appl. No.: 17/978,561

(22) Filed: Nov. 1, 2022

(65) Prior Publication Data

US 2023/0166811 A1  Jun. 1, 2023

(30) Foreign Application Priority Data

Nov. 29, 2021  (JP) ................................ 2021-193306

(51) Int. Cl.
*B62M 9/123* (2010.01)
*B62M 9/122* (2010.01)
*B62M 9/133* (2010.01)

(52) U.S. Cl.
CPC ............ *B62M 9/123* (2013.01); *B62M 9/122* (2013.01)

(58) Field of Classification Search
CPC ...... B62M 9/123; B62M 9/122; B62M 9/133; B62M 6/50; B62M 25/08; B62M 6/55; B62J 45/41; B62K 27/003; F16H 2061/0227

See application file for complete search history.

(56) References Cited

U.S. PATENT DOCUMENTS

| | | | |
|---|---|---|---|
| 7,967,724 B2* | 6/2011 | Kojima | F16H 61/0213 701/56 |
| 2002/0113401 A1 | 8/2002 | Horiuchi | |
| 2005/0090962 A1* | 4/2005 | Ota | F16H 59/66 701/56 |
| 2016/0016624 A1* | 1/2016 | Abe | B62J 50/22 701/52 |
| 2016/0121730 A1* | 5/2016 | Fujita | B60L 50/50 701/22 |
| 2019/0118903 A1* | 4/2019 | Nishino | B62L 3/02 |
| 2019/0291814 A1* | 9/2019 | Tsuchizawa | B62M 6/45 |
| 2019/0309841 A1 | 10/2019 | Shahana et al. | |
| 2020/0130778 A1 | 4/2020 | Shahana et al. | |
| 2021/0188394 A1 | 6/2021 | Shahana et al. | |

FOREIGN PATENT DOCUMENTS

| | | |
|---|---|---|
| JP | 2020-90242 A | 6/2020 |
| JP | 2021-54370 A | 4/2021 |
| JP | 2021-95119 A | 6/2021 |

* cited by examiner

Primary Examiner — Tisha D Lewis
(74) Attorney, Agent, or Firm — Global IP Counselors, LLP

(57) ABSTRACT

A control device is configured to control a transmission device in accordance with a situation in which a human-powered vehicle is used. The control device includes an electronic controller. The electronic controller is configured to control the transmission device provided to the human-powered vehicle. The electronic controller is configured to change a transmission range of the transmission device in accordance with at least one of an attachment state of a cargo bed to the human-powered vehicle, a weight of a cargo loaded on the human-powered vehicle, or a weight of a user riding on the human-powered vehicle.

16 Claims, 10 Drawing Sheets

CONTROL DEVICE AND CONTROL SYSTEM FOR HUMAN-POWERED VEHICLE

CROSS-REFERENCE TO RELATED APPLICATIONS

This application claims priority to Japanese Patent Application No. 2021-193306, filed on Nov. 29, 2021. The entire disclosure of Japanese Patent Application No. 2021-193306 is hereby incorporated herein by reference.

BACKGROUND

Technical Field

The present disclosure generally relates to a technique of a control device and a control system for a human-powered vehicle.

Background Information

For example, a human-powered vehicle disclosed in Japanese Laid-Open Patent Publication No. 2021-95119 A (Patent Literature 1) includes a controller that controls a transmission device in accordance with a traveling state of the human-powered vehicle.

SUMMARY

There is a demand for a technique capable of controlling a transmission device in accordance with a situation in which a human-powered vehicle is used.

An object of the present disclosure is to provide a control device and a control system capable of improving convenience by controlling a transmission device in accordance with a situation in which a human-powered vehicle is used.

A control device according to a first aspect of the present disclosure is a control device for a human-powered vehicle. The control device comprises an electronic controller. The electronic controller is configured to control a transmission device provided in the human-powered vehicle. The electronic controller is configured to change a transmission range of the transmission device in accordance with at least one of an attachment state of a cargo bed to the human-powered vehicle, a weight of a cargo loaded on the human-powered vehicle, or a weight of a user riding on the human-powered vehicle. In the control device of the first aspect, the electronic controller can change the transmission range of the transmission device in accordance with at least one of the attachment state of the cargo bed to the human-powered vehicle, the weight of the cargo loaded on the human-powered vehicle, or the weight of the user riding on the human-powered vehicle. Thus, convenience is improved.

A control device according to a second aspect of the present disclosure is a control device for a human-powered vehicle. The control device comprises an electronic controller. The electronic controller is configured to control a transmission device provided in the human-powered vehicle in a plurality of control states, in which the plurality of control states includes a first control state in which the transmission device is controlled in accordance with a traveling state of the human-powered vehicle and a second control state in which the transmission device is controlled in accordance with an operation of an operation device provided in the human-powered vehicle. The electronic controller is configured to switch one of the first control state or the second control state to another of the first control state or the second control state in accordance with at least one of an attachment state of a cargo bed to the human-powered vehicle, a weight of a cargo loaded on the human-powered vehicle, or a weight of a user riding on the human-powered vehicle. In the control device of the second aspect, the electronic controller can select whether to control the transmission device automatically in accordance with at least one of the attachment state of the cargo bed to the human-powered vehicle, the weight of the cargo loaded on the human-powered vehicle, or the weight of the user riding on the human-powered vehicle, or control the transmission device in accordance with an instruction of a user. Thus, convenience is improved.

In the control device of a third aspect according to the second aspect, the electronic controller is configured to switch the second control state to the first control state in a case where the cargo bed is attached to the human-powered vehicle in the second control state. In the control device of the third aspect, in a case where the cargo bed is attached to the human-powered vehicle, energy required for a rider to propel the human-powered vehicle increases, and thus the rider can concentrate on pedaling by the electronic controller controlling the transmission device in the first control state.

In the control device of a fourth aspect according to the second or third aspect, the electronic controller is configured to switch the second control state to the first control state in a case where the weight of the cargo loaded on the human-powered vehicle is greater than or equal to a first value in the second control state. In the control device of the fourth aspect, in a case where the weight of the cargo loaded on the human-powered vehicle is greater than or equal to the first value, the energy required for the rider to propel the human-powered vehicle increases, and thus the rider can concentrate on pedaling by the electronic controller controlling the transmission device in the first control state.

In the control device of a fifth aspect according to any one of the second to fourth aspects, the electronic controller is configured to switch the second control state to the first control state in a case where the weight of the user riding on the human-powered vehicle is greater than or equal to a second value in the second control state. In the control device of the fifth aspect, in a case where the weight of the user riding on the human-powered vehicle is greater than or equal to the second value, the energy required for the rider to propel the human-powered vehicle increases, and thus the rider can concentrate on pedaling by the electronic controller controlling the transmission device in the first control state.

In the control device of a sixth aspect according to the second aspect, the electronic controller is configured to change a transmission range of the transmission device according to at least one of the attachment state of the cargo bed to the human-powered vehicle, the weight of the cargo loaded on the human-powered vehicle, or the weight of the user riding on the human-powered vehicle. In the control device of the sixth aspect, the electronic controller can select whether to control the transmission device automatically in accordance with at least one of the attachment state of the cargo bed to the human-powered vehicle, the weight of the cargo loaded on the human-powered vehicle, or the weight of the user riding on the human-powered vehicle, or control the transmission device in accordance with an instruction of a user. Thus, convenience is improved.

In the control device of a seventh aspect according to the first or sixth aspect, a minimum transmission ratio in the transmission range in a case where the cargo bed is attached to the human-powered vehicle is smaller than a minimum transmission ratio in the transmission range in a case where the cargo bed is not attached to the human-powered vehicle. In the control device of the seventh aspect, in a case where the cargo bed is attached to the human-powered vehicle, an increase in a pedaling torque of the rider is suppressed by selecting the minimum transmission ratio.

In the control device of an eighth aspect according to the first, sixth, or seventh aspect, a maximum transmission ratio in the transmission range in a case where the cargo bed is attached to the human-powered vehicle is smaller than a maximum transmission ratio in the transmission range in a case where the cargo bed is not attached to the human-powered vehicle. In the control device of the eighth aspect, in a case where the cargo bed is attached to the human-powered vehicle, an increase in a speed of the human-powered vehicle by pedaling of the rider is suppressed.

In the control device of a ninth aspect according to any one of the first and sixth to eighth aspects, the transmission range in the case where the cargo bed is attached to the human-powered vehicle is narrower than the transmission range in the case where the cargo bed is not attached to the human-powered vehicle. In the control device of the ninth aspect, the transmission range is narrowed to a more appropriate transmission range in the case where the cargo bed is attached to the human-powered vehicle.

In the control device of a tenth aspect according to any one of the first and sixth to ninth aspects, a minimum transmission ratio in the transmission range in a case where the weight of the cargo loaded on the human-powered vehicle is greater than or equal to a first value is smaller than a minimum transmission ratio in the transmission range in a case where the weight of the cargo loaded on the human-powered vehicle is smaller than the first value. In the control device of the tenth aspect, in a case where the weight of the cargo loaded on the human-powered vehicle is greater than or equal to the first value, an increase in the pedaling torque of the rider is suppressed by selecting the minimum transmission ratio.

In the control device of an eleventh aspect according to any one of the first and sixth to tenth aspects, a maximum transmission ratio in the transmission range in a case where the weight of the cargo loaded on the human-powered vehicle is greater than or equal to a first value is smaller than a maximum transmission ratio in the transmission range in a case where the weight of the cargo loaded on the human-powered vehicle is smaller than the first value. In the control device of the eleventh aspect, in a case where the weight of the cargo loaded on the human-powered vehicle is greater than or equal to the first value, an increase in the speed of the human-powered vehicle by pedaling of the rider is suppressed.

In the control device of a twelfth aspect according to any one of the first and sixth to eleventh aspects, the transmission range in a case where the weight of the cargo loaded on the human-powered vehicle is greater than or equal to a first value is narrower than the transmission range in a case where the weight of the cargo loaded on the human-powered vehicle is smaller than the first value. In the control device of the twelfth aspect, the transmission range is narrowed to a more appropriate transmission range in the case where the weight of the cargo loaded on the human-powered vehicle is greater than or equal to the first value.

In the control device of a thirteenth aspect according to any one of the first and sixth to twelfth aspects, a minimum transmission ratio in the transmission range in a case where the weight of the user riding on the human-powered vehicle is greater than or equal to a second value is smaller than a minimum transmission ratio in the transmission range in a case where the weight of the user riding on the human-powered vehicle is smaller than the second value. In the control device of the thirteenth aspect, in a case where the weight of the user riding on the human-powered vehicle is greater than or equal to the second value, an increase in the pedaling torque of the rider is suppressed by selecting the minimum transmission ratio.

In the control device of a fourteenth aspect according to any one of the first and sixth to thirteenth aspects, a maximum transmission ratio in the transmission range in a case where the weight of the user riding on the human-powered vehicle is greater than or equal to a second value is smaller than a maximum transmission ratio in the transmission range in a case where the weight of the user riding on the human-powered vehicle is smaller than the second value. In the control device of the fourteenth aspect, in a case where the weight of the user riding on the human-powered vehicle is greater than or equal to the second value, an increase in the speed of the human-powered vehicle by pedaling of the rider is suppressed.

In the control device of a fifteenth aspect according to any one of the first and sixth to fourteenth aspects, the transmission range in the case where the weight of the user riding on the human-powered vehicle is greater than or equal to a second value is narrower than the transmission range in the case where the weight of the user riding on the human-powered vehicle is smaller than the second value. In the control device of the fifteenth aspect, the transmission range is narrowed to a more appropriate transmission range in the case where the weight of the user riding on the human-powered vehicle is greater than or equal to the second value.

A control system according to a sixteenth aspect of the present disclosure comprises the control device according to any one of the first to fifteenth aspects, and the control system further comprises a sensor configured to detect at least one of an attachment state of a cargo bed to a human-powered vehicle, a weight of a cargo loaded on the human-powered vehicle, or a weight of a user riding on the human-powered vehicle. In the control system of the sixteenth aspect, the transmission device can be controlled in accordance with at least one of the attachment state of the cargo bed to the human-powered vehicle, the weight of the cargo loaded on the human-powered vehicle, or the weight of the user riding on the human-powered vehicle. Thus, convenience can be improved.

The control device and the control system of the present disclosure can improve convenience by controlling the transmission device in accordance with a situation in which the human-powered vehicle is used.

BRIEF DESCRIPTION OF THE DRAWINGS

Referring now to the attached drawings which form a part of this original disclosure.

DETAILED DESCRIPTION OF EMBODIMENTS

Figure 1:
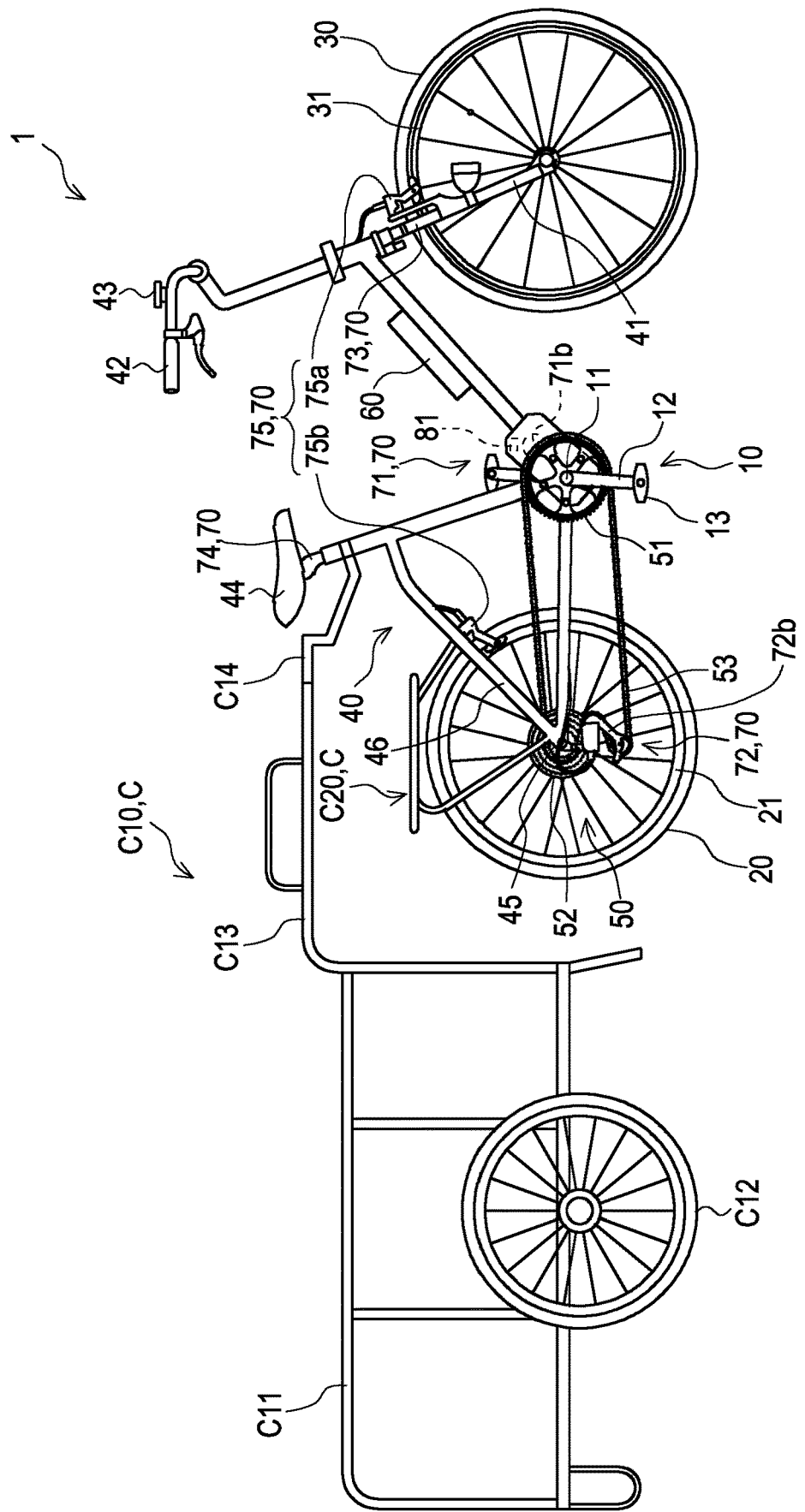
FIG. 1 is a side elevational view of a human-powered vehicle including a control device according to a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A human-powered vehicle 1 including a control device 81 according to a first embodiment will be described. FIGS. 1 to 4 are used to describe the human-powered vehicle 1 including the control device 81 according to the first embodiment. The human-powered vehicle 1 is a vehicle that has at least one wheel and can be driven by at least a human driving force. The human-powered vehicle 1 includes various types of bicycles such as a mountain bike, a road bike, a city bike, a cargo bike, a hand bike, and a recumbent bike. The number of wheels included in the human-powered vehicle 1 is not limited. The human-powered vehicle 1 includes, for example, a single-wheeled vehicle and a vehicle having two or more wheels. The human-powered vehicle 1 is not limited to a vehicle that can be driven only by a human driving force. The human-powered vehicle 1 includes an E-bike that uses not only a human driving force but also a driving force of an electric motor for propulsion. The E-bike includes a power-assisted bicycle whose propulsion is assisted by an electric motor. Hereinafter, in the embodiment, the human-powered vehicle 1 is described as a bicycle.

The human-powered vehicle 1 includes a crank 10, a rear wheel 20, a front wheel 30, a frame 40, a drive mechanism 50, a battery 60, a human-powered vehicle component 70, and a control system 80. The crank 10 illustrated in FIG. 1 includes a crankshaft 11 rotatable with respect to the frame 40 and a pair of crank arms 12 provided at both ends in an axial direction of the crankshaft 11. A pedal 13 is coupled to each of the crank arms 12.

The rear wheel 20 and the front wheel 30 are supported by the frame 40. The front wheel 30 is attached to a front fork 41 provided at a front part of the frame 40. A handle 42 is coupled to the front fork 41. The handle 42 is provided with an operation device 43 for operating the human-powered vehicle component 70. In the present embodiment, the operation device 43 includes a cycle computer. The operation device 43 outputs a signal corresponding to an operation by a user to an electronic controller 81a. The rear wheel 20 is attached to a rear part of the frame 40. A seat 44 is provided on an upper part of the frame 40.

The drive mechanism 50 couples the crank 10 to the rear wheel 20. The drive mechanism 50 includes a first rotating body 51 coupled to the crankshaft 11, a second rotating body 52 coupled to the rear wheel 20, and a chain 53 coupling the first rotating body 51 to the second rotating body 52.

The first rotating body 51 includes at least one front sprocket. In the present embodiment, the first rotating body 51 includes one front sprocket. The first rotating body 51 can include two or more front sprockets having different numbers of teeth. In a case where the first rotating body 51 includes two or more front sprockets having different numbers of teeth, in a state where the first rotating body 51 is attached to the human-powered vehicle 1, a front sprocket having the largest number of teeth is disposed farther from a center surface of the frame 40 of the bicycle than a front sprocket having the smallest number of teeth.

The second rotating body 52 includes at least one rear sprocket. The second rotating body 52 includes two or more rear sprockets having different numbers of teeth. The second rotating body 52 can include twelve or more rear sprockets having different numbers of teeth. In a case where the second rotating body 52 includes two or more front sprockets, in a state where the second rotating body 52 is attached to the human-powered vehicle 1, a rear sprocket having the largest number of teeth is disposed closer to the center surface of the frame 40 of the bicycle than a rear sprocket having the smallest number of teeth. The chain 53 couples one front sprocket included in the first rotating body 51 to one rear sprocket included in the second rotating body 52. A rotational force of the first rotating body 51 is transmitted to the rear sprocket through the chain 53.

The drive mechanism 50 of the present embodiment transmits the front sprocket, the rear sprocket, and the rotational force using the chain 53, but the configuration of the drive mechanism 50 is not limited. For example, the first rotating body 51 and the second rotating body 52 can include a pulley, a bevel gear, or the like instead of the sprocket. The first rotating body 51 and the second rotating body 52 can be coupled by a belt, a shaft, or the like instead of the chain 53.

Figure 2:
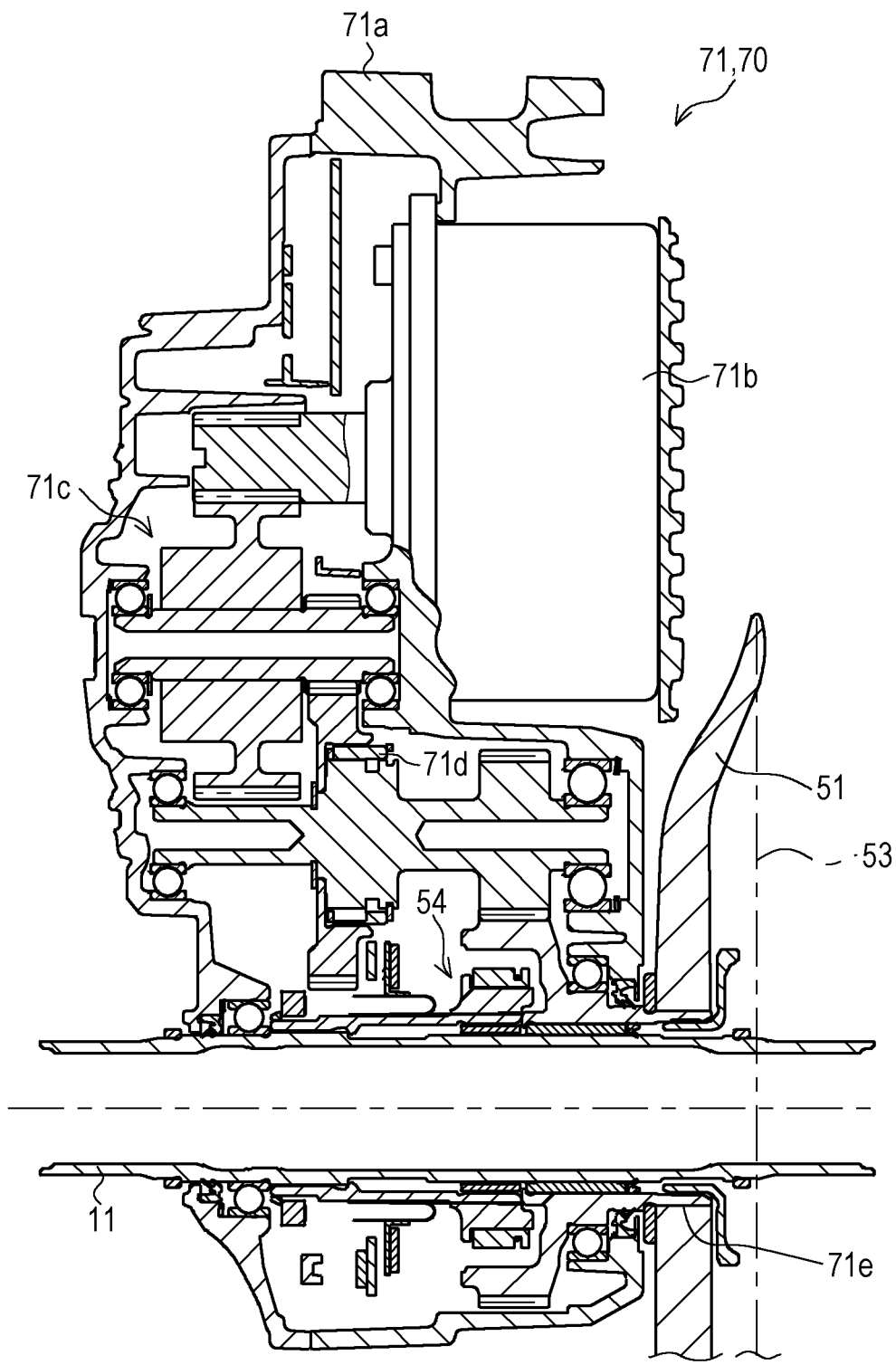
FIG. 2 is a sectional view of a drive unit included in the human-powered vehicle in FIG. 1.

As illustrated in FIG. 2, a first one-way clutch 54 can be provided between the crankshaft 11 and the first rotating body 51. The first one-way clutch 54 causes the first rotating body 51 to rotate forward in a case where the crank 10 rotates forward, and allows relative rotation of the crankshaft 11 and the first rotating body 51 in a case where the crank 10 rotates rearward. A second one-way clutch is provided between the second rotating body 52 and the rear wheel 20. The second one-way clutch causes the rear wheel 20 to rotate forward in a case where the second rotating body 52 rotates forward, and allows relative rotation of the second rotating body 52 and the rear wheel 20 in a case where the second rotating body 52 rotates rearward.

The battery 60 illustrated in FIG. 1 supplies power to an electrical component provided in the human-powered vehicle 1. The battery 60 is provided in at least one of the inside or the outside of the frame 40. The battery 60 can supply power to the human-powered vehicle component 70 and the control device 81. The battery 60 can be capable of supplying power to a drive unit 71. The battery 60 can include a plurality of batteries and can supply power to each of a plurality of human-powered vehicle components 70. A single battery 60 can be capable of supplying power to the human-powered vehicle component 70 and the drive unit 71. The battery 60 can be provided directly in the human-powered vehicle component 70.

Figure 3:
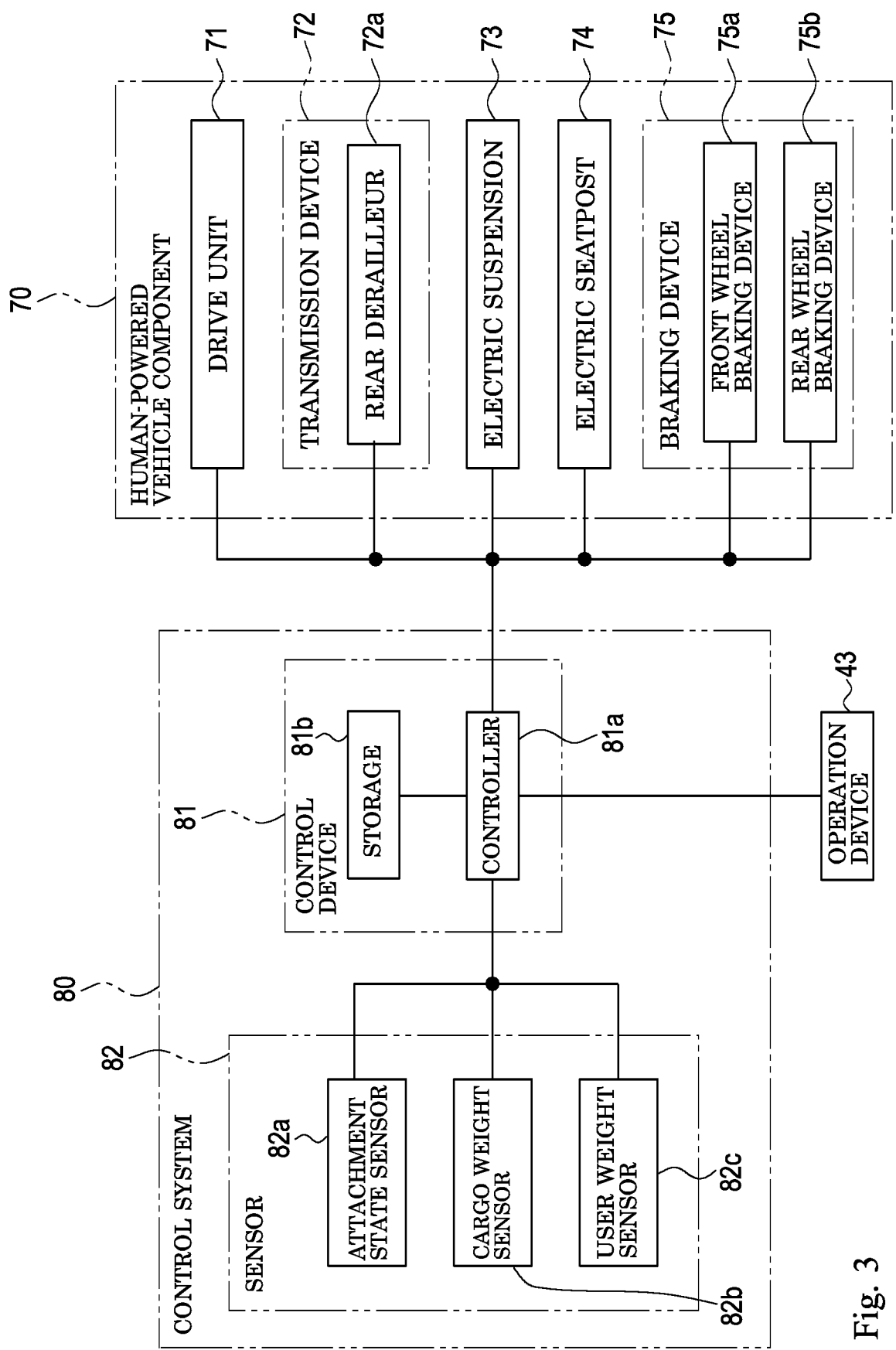
FIG. 3 is a block diagram of a control system included in the human-powered vehicle.

The human-powered vehicle component 70 illustrated in FIGS. 1 and 3 electrically operates in accordance with at least one condition different from the operation of the operation device 43. The human-powered vehicle component 70 includes the drive unit 71, a transmission device 72, an electric suspension 73, an electric seatpost 74, and a braking device 75. The drive unit 71 assists in the propulsion of the human-powered vehicle 1. The drive unit 71 illustrated in FIG. 2 includes a housing 71a, a motor 71b, a speed reducer 71c, a third one-way clutch 71d, and an output unit 71e.

The housing 71a is attached to the frame 40. The housing 71a rotatably supports the crankshaft 11. The motor 71b is provided to transmit a rotation to the front wheel 30 or a power transmission path of the human driving force from the pedals 13 to the rear wheel 20. In the present embodiment, the motor 71b is provided to transmit the rotation to a power transmission path from the crankshaft 11 to the first rotating body 51. The motor 71b operates in accordance with the human driving force, for example. The speed reducer 71c includes, for example, a plurality of gears. The speed reducer 71c is provided between the motor 71b and the crankshaft 11. The third one-way clutch 71d is provided between the motor 71b and the crankshaft 11 such that the rotational force of the crankshaft 11 is not transmitted to the motor 71b in a case where the crank 10 rotates forward. The output unit 71e is coupled to, for example, the crankshaft 11 and the speed reducer 71c. The human driving force and the output of the motor 71b are input to the output unit 71e. The output unit 71e is rotated by receiving the human driving force and the output of the motor 71b. The first rotating body 51 rotates integrally with the output unit 71e.

The transmission device 72 illustrated in FIGS. 1 and 3 changes a transmission ratio as a ratio of a rotational speed of the rear wheel 20 to a rotational speed of the crankshaft 11. The transmission ratio is calculated by a value obtained by dividing the number of teeth of the front sprocket with which the chain 53 is engaged by the number of teeth of the rear sprocket with which the chain 53 is engaged. The transmission device 72 includes an external transmission. The external transmission includes at least one of a front derailleur or a rear derailleur 72a. In the present embodiment, the transmission device 72 includes the rear derailleur 72a. The rear derailleur 72a can change a transmission stage by moving the chain 53 between a plurality of rear sprockets. The rear derailleur 72a can change the transmission ratio of the human-powered vehicle 1 by changing the transmission stage. In a case where the transmission device 72 includes a front derailleur, the first rotating body 51 includes at least two or more front sprockets. In a case where the transmission device 72 does not include the rear derailleur 72a, the second rotating body 52 includes one rear sprocket.

The electric suspension 73 absorbs an impact applied to the human-powered vehicle 1. The electric suspension 73 includes at least one of an electric rear suspension corresponding to the rear wheel 20 or an electric front suspension corresponding to the front wheel 30. In the present embodiment, the electric suspension 73 includes an electric front suspension corresponding to the front wheel 30.

The electric seatpost 74 changes a height of the seat 44. In the present embodiment, the height of the seat 44 with respect to the frame 40 is changed in accordance with the driving of the electric seatpost 74.

The braking device 75 is configured to brake each of the wheels. The braking device 75 includes a front wheel braking device 75a corresponding to the front wheel 30 and a rear wheel braking device 75b corresponding to the rear wheel 20. The front wheel braking device 75a and the rear wheel braking device 75b are, for example, rim braking devices that brake a rim 31 of the front wheel 30 and a rim 21 of the rear wheel 20. The front wheel braking device 75a and the rear wheel braking device 75b can be disc braking devices that brake a disc brake rotor provided on the wheel.

The human-powered vehicle 1 illustrated in FIG. 1 is configured such that a cargo bed C is detachable. The cargo bed C includes at least one of a towed vehicle C10, a carrier, a front basket, or a rear basket. In the present embodiment, the cargo bed C includes the towed vehicle C10 and the carrier.

The towed vehicle C10 includes a body C11, a wheel C12, a connecting portion C13, and a coupling portion C14. The body C11 can support a cargo that is loaded to the body C11. The body C11 is disposed at a rear part of the human-powered vehicle 1. The wheel C12 is provided on the body C11. The connecting portion C13 connects the body C11 and the coupling portion C14 to each other. The connecting portion C13 can be configured integrally with at least one of the body C11 or the coupling portion C14. The connecting portion C13 can be configured separately from the body C11 and the coupling portion C14. The connecting portion C13 can support a cargo. The coupling portion C14 can be coupled to the human-powered vehicle 1. In the present embodiment, the coupling portion C14 is coupled to a portion of the frame 40 that supports the electric seatpost 74. The coupling portion C14 is configured to rotate relative to the frame 40 in a yaw direction. The towed vehicle C10 can be coupled to the human-powered vehicle 1 so as to be disposed in front of or on a side of the human-powered vehicle 1. The towed vehicle C10 can be configured by omitting the connecting portion C13.

The carrier can support a cargo. The carrier includes a front carrier disposed above the front wheel 30 and a rear carrier C20 disposed above the rear wheel 20. In the present embodiment, the carrier includes the rear carrier C20. The rear carrier C20 is coupled to a rear end 45 of the frame 40 and a seat stay 46.

The control system 80 includes the control device 81 and a sensor 82. The sensor 82 is configured to detect at least one of an attachment state of the cargo bed C to the human-powered vehicle 1, a weight of a cargo loaded on the human-powered vehicle 1, or a weight of a user riding on the human-powered vehicle 1. The term "sensor" as used herein refers to a physical device or instrument designed to sense the presence or absence of a particular event, object, substance, or a change in its environment, and to emit a signal in indicative of the detection. The term "sensor" as used herein does not include a human being. FIG. 3 illustrates an example of the control system 80. The control system 80 illustrated in FIG. 3 includes the control device 81 for a human-powered vehicle and the sensor 82. The control device 81 includes the electronic controller 81a and a storage 81b.

The electronic controller 81a performs control related to the human-powered vehicle 1. The electronic controller 81a is a hardware device that manages and/or directs the flow of data for controlling the drive unit 71, the transmission device 72, the electric suspension 73, the electric seatpost 74 and the braking device 75. The electronic controller 81a includes a calculation processor that executes a predetermined control program. The calculation processor includes, for example, a central processing unit (CPU) or a micro processing unit (MPU). The electronic controller 81a can include one or a plurality of microcomputers. The electronic controller 101 is formed of one or more semiconductor chips that are mounted on a circuit board. Thus, the terms "electronic controller" and "controller" as used herein refers to hardware that executes a software program, and does not include a human being.

The storage 81b stores information used for various control programs and various control processing. The storage 81b is any computer storage device or any non-transitory computer-readable medium with the sole exception of a transitory, propagating signal. The storage 81b stores information used for various control programs and various control processing. The storage 81b includes, for example, a nonvolatile memory and a volatile memory. For example, the storage 81b can include an internal memory, or other type of memory devices such as a ROM (Read Only Memory) device, a RAM (Random Access Memory) device, a hard disk, a flash drive, etc. The electronic controller 81a stores and reads data and/or programs from the storage 81b.

The electronic controller 81a is configured to control the transmission device 72. In the present embodiment, the electronic controller 81a is configured to control the transmission device 72 provided in the human-powered vehicle 1 in a plurality of control states. The plurality of control states include a first control state in which the transmission device 72 is controlled in accordance with the traveling state of the human-powered vehicle 1 and a second control state in which the transmission device 72 is controlled in accordance with the operation of the operation device 43 provided in the human-powered vehicle 1. The traveling state of the human-powered vehicle 1 includes at least one of cadence, torque acting on the crank 10 of the human-powered vehicle 1, a vehicle speed of the human-powered vehicle 1, or acceleration of the human-powered vehicle 1. The cadence is synonymous with the rotational speed of the crank 10. The traveling state of the human-powered vehicle 1 can include power input to the crank 10. The power is defined by multiplying the cadence by the torque acting on the crank 10. Information on the traveling state of the human-powered vehicle 1 is detected by, for example, various sensors mounted on the human-powered vehicle 1.

Figure 4:
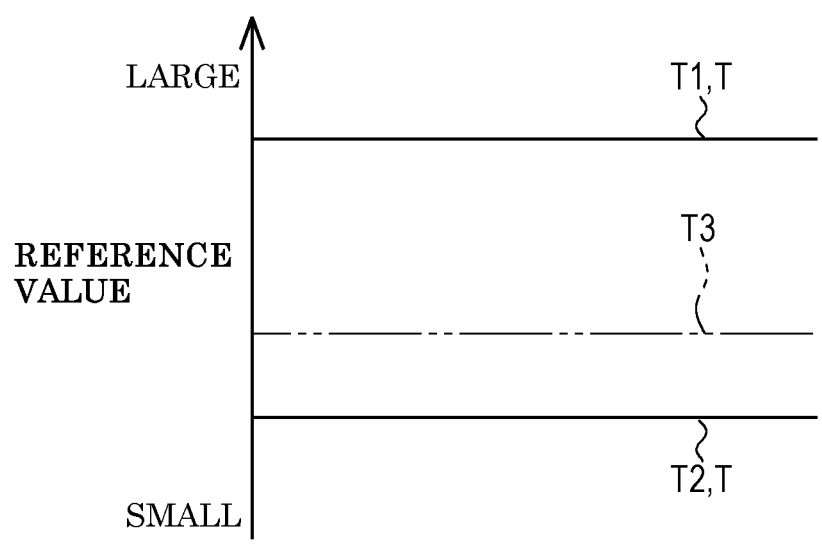
FIG. 4 is a diagram illustrating a transmission threshold used when a transmission stage is changed.

In the first control state, the electronic controller 81a controls the transmission device 72 in accordance with the traveling state of the human-powered vehicle 1 by using a reference value and a transmission threshold T shown in FIG. 4. The reference value includes, for example, the information on the traveling state of the human-powered vehicle 1. In the present embodiment, the reference value includes the cadence. The reference value can include the torque acting on the crank 10 of the human-powered vehicle 1, the vehicle speed of the human-powered vehicle 1, and the acceleration of the human-powered vehicle 1. The reference value can include the power input to the crank 10.

The transmission threshold T includes a first transmission threshold T1 and a second transmission threshold T2. The first transmission threshold T1 is different from the second transmission threshold T2. In the present embodiment, the first transmission threshold T1 is greater than the second transmission threshold T2.

In the first control state, the electronic controller 81a controls the transmission device 72 such that the transmission ratio of the human-powered vehicle 1 increases in accordance with a relationship between the reference value and the first transmission threshold T1. In the present embodiment, the electronic controller 81a controls the transmission device 72 such that the transmission ratio of the human-powered vehicle 1 increases when the reference value exceeds the first transmission threshold T1. In a case where the transmission ratio of the human-powered vehicle 1 is a maximum transmission ratio, the electronic controller 81a does not operate the transmission device 72 even when the reference value exceeds the first transmission threshold T1. A maximum transmission ratio in the external transmission is a maximum transmission ratio based on a relationship between the first rotating body 51 and the second rotating body 52.

In the first control state, the electronic controller 81a controls the transmission device 72 such that the transmission ratio of the human-powered vehicle 1 decreases in accordance with a relationship between the reference value and the second transmission threshold T2. In the present embodiment, the electronic controller 81a controls the transmission device 72 such that the transmission ratio of the human-powered vehicle 1 decreases when the reference value falls below the second transmission threshold T2. In a case where the transmission ratio of the human-powered vehicle 1 is a minimum transmission ratio, the electronic controller 81a does not operate the transmission device 72 even when the reference value falls below the second transmission threshold T2. A minimum transmission ratio in the external transmission is a minimum transmission ratio based on a relationship between the first rotating body 51 and the second rotating body 52.

The operation device 43 is configured to output a switching signal for switching the control state to the electronic controller 81a in a case where a predetermined operation is performed. The electronic controller 81a is configured to switch the control state in accordance with the switching signal output from the operation device 43. The storage 81b stores information on the current control state. In the present embodiment, the information on the current control state includes information indicating that the current control state is one of the first control state or the second control state.

The sensor 82 illustrated in FIG. 3 detects at least one of the attachment state of the cargo bed C to the human-powered vehicle 1, the weight of the cargo loaded on the human-powered vehicle 1, or the weight of the user riding on the human-powered vehicle 1. The user includes at least one of a rider or a child sitting in a child seat attached to the human-powered vehicle 1. The sensor 82 includes an attachment state sensor 82a, a cargo weight sensor 82b, and a user weight sensor 82c.

The attachment state sensor 82a is a sensor that detects the attachment state of the cargo bed C to the human-powered vehicle 1. The attachment state sensor 82a is provided on at least one of the human-powered vehicle 1 or the cargo bed C. The attachment state sensor 82a outputs an attachment signal to the electronic controller 81a, according to the attachment state of the cargo bed C to the human-powered vehicle 1. The attachment state sensor 82a includes at least one of a contact sensor, a load sensor, a first communicator capable of wireless communication, or a reading sensor. The attachment state sensor 82a can include a camera.

The contact sensor (the attachment state sensor 82a) is configured to detect contact between the human-powered vehicle 1 and the cargo bed C. The electronic controller 81a can determine the cargo bed C is attached to the human-powered vehicle 1 on the basis of the contact between the human-powered vehicle 1 and the cargo bed C detected by the contact sensor (the attachment state sensor 82a).

The load sensor (the attachment state sensor 82a) is configured to detect a load acting on a portion coupling the human-powered vehicle 1 and the cargo bed C. The electronic controller 81a can determine the cargo bed C is attached to the human-powered vehicle 1 on the basis of the load detected by the load sensor (the attachment state sensor 82a).

The first communicator (the attachment state sensor 82a) is configured to communicate with a second communicator different from the first communicator. In the present embodiment, the first communicator (the attachment state sensor 82a) is provided on one of the human-powered vehicle 1 or the cargo bed C, and the second communicator is provided on the other of the human-powered vehicle 1 or the cargo bed C. In the present embodiment, in a case where a relative distance between the human-powered vehicle 1 and the cargo bed C is less than a predetermined distance, communication between the first communicator (the attachment state sensor 82a) and the second communicator is executed. The electronic controller 81a can determine the cargo bed C is attached to the human-powered vehicle 1 on the basis of the communication between the first communicator (the attachment state sensor 82a) and the second communicator.

The reading sensor (the attachment state sensor 82a) is configured to read at least one of a barcode or a two-dimensional code. In the present embodiment, the reading sensor (the attachment state sensor 82a) is provided on one of the human-powered vehicle 1 or the cargo bed C, and at least one of the barcode or the two-dimensional code is provided on the other of the human-powered vehicle 1 or the cargo bed C. The electronic controller 81a can determine the cargo bed C is attached to the human-powered vehicle 1 on the basis of the reading of the reading sensor (the attachment state sensor 82a).

The cargo weight sensor 82b is a sensor that detects the weight of the cargo loaded on the human-powered vehicle 1. The weight of the cargo loaded on the human-powered vehicle 1 includes at least one of the weight of the cargo loaded on the cargo bed C or the weight of the cargo loaded on the human-powered vehicle 1. In the present embodiment, the weight of the cargo loaded on the human-powered vehicle 1 includes the weight of the cargo loaded on the cargo bed C.

The cargo weight sensor 82b outputs a cargo weight signal corresponding to the weight of the cargo loaded on the human-powered vehicle 1 to the electronic controller 81a. The cargo weight sensor 82b is provided on the cargo bed C. In the present embodiment, the cargo weight sensor 82b is provided on the rear carrier C20 and the towed vehicle C10. The cargo weight sensor 82b provided on the rear carrier C20 includes a weight sensor that detects the weight of the cargo loaded on the rear carrier C20. The cargo weight sensor 82b provided on the towed vehicle C10 includes at least one of a body-side weight sensor that detects the weight of the cargo loaded on the body C11 or an air pressure sensor that detects an air pressure of a tire of the towed vehicle C10.

The body-side weight sensor has, for example, a sheet shape and is laid on an upper surface of the body C11. The cargo loaded on the body C11 is placed on the body-side weight sensor. The body-side weight sensor is configured to detect the weight of the cargo on the basis of a pressure applied from the cargo.

In a case where the cargo weight sensor 82b provided in the towed vehicle C10 includes an air pressure sensor, the electronic controller 81a determines the weight of the cargo loaded on the body C11 on the basis of the air pressure of the tire detected by the air pressure sensor.

The electronic controller 81a can acquire the weight of the cargo loaded on the human-powered vehicle 1 by adding the weight of the cargo loaded on the body C11 and the weight of the cargo loaded on the rear carrier C20 detected by the cargo weight sensor 82b.

The user weight sensor 82c is a sensor that detects the weight of the user riding on the human-powered vehicle 1. The user weight sensor 82c outputs, to the electronic controller 81a, a user weight signal corresponding to the weight of the user riding on the human-powered vehicle 1. The user weight sensor 82c is provided in a riding portion on which the user rides. The riding portion includes the seat 44 on which the rider is seated, the child seat attached to the human-powered vehicle 1, the towed vehicle on which a person can ride, and the like. The user weight sensor 82c is provided on at least one of the seat 44 on which the rider is seated, the child seat attached to the human-powered vehicle 1, and the towed vehicle on which a person can ride. In the present embodiment, the user weight sensor 82c is provided on the seat 44 on which the rider is seated.

The user weight sensor 82c provided on the seat 44 on which the rider is seated includes a weight sensor that detects the weight of the rider. In a case where a child seat is attached to the human-powered vehicle 1, the user weight sensor 82c includes a weight sensor that detects the weight of a child riding on the child seat. In a case where the human-powered vehicle 1 tows the towed vehicle on which a person can ride, the user weight sensor 82c includes at least one of the weight sensor that detects the weight of the user riding on the towed vehicle on which the person can ride or the air pressure sensor that detects the air pressure of the tire of the towed vehicle on which the person can ride. In a case where the user weight sensor 82c includes the air pressure sensor, the electronic controller 81a determines the weight of the user on the basis of the air pressure of the tire detected by the air pressure sensor.

In a case where the user weight sensor 82c is provided in two or more riding portions, the electronic controller 81a can acquire the weight of the users riding on the human-powered vehicle 1 by adding the weights of the users detected by the user weight sensor 82c provided on the two or more riding portions.

The electronic controller 81a is configured to switch one of the first control state or the second control state to the other of the first control state or the second control state in accordance with at least one of the attachment state of the cargo bed C to the human-powered vehicle 1, the weight of the cargo loaded on the human-powered vehicle 1, or the weight of the user riding on the human-powered vehicle 1. In the present embodiment, the electronic controller 81a switches one of the first control state or the second control state to the other of the first control state or the second control state in accordance with the attachment state of the cargo bed C to the human-powered vehicle 1. In the present embodiment, the electronic controller 81a is configured to switch the second control state to the first control state in a case where the cargo bed C is attached to the human-powered vehicle 1 in the second control state.

Figure 5:
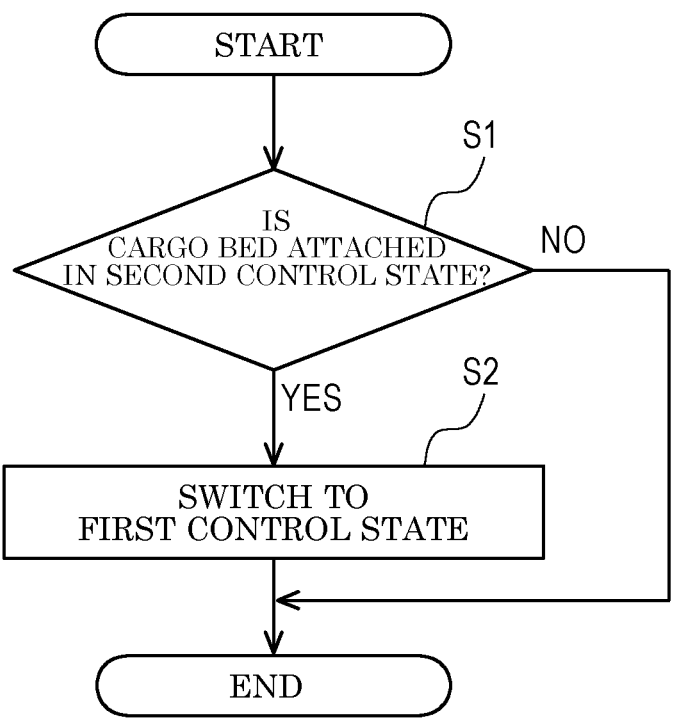
FIG. 5 is a flowchart illustrating a control flow in accordance with the first embodiment.

An example of control executed by the electronic controller 81a will be described. FIG. 5 is used to describe the example of the control executed by the electronic controller 81a. The electronic controller 81a starts a first control flow according to a flowchart illustrated in FIG. 5 in a case where a first condition set in advance is satisfied. In the present embodiment, the electronic controller 81a starts the first control flow in a case where power supplying from the battery 60 to the electronic controller 81a is started and in a case where a predetermined operation is performed in the operation device 43. When the first control flow ends, the electronic controller 81a repeatedly executes the first control flow at predetermined time intervals until a second condition set in advance is satisfied. In the present embodiment, the electronic controller 81a repeatedly executes the first control flow at predetermined time intervals until a predetermined operation is performed in the operation device 43. The first condition set in advance is satisfied, for example, in a case where power is fed to the electronic controller 81a. The second condition set in advance is satisfied, for example, in a case where power supplying to the electronic controller 81*a* is stopped.

In step S1, the electronic controller 81*a* determines the attachment state of the cargo bed C on the basis of the attachment signal output from the attachment state sensor 82*a*. In step S1, the electronic controller 81*a* further reads information on the current control state from the storage 81*b* to determine the current control state. In step S1, in a case where the electronic controller 81*a* determines that the cargo bed C is attached to the human-powered vehicle 1 in the second control state on the basis of the detected attachment state of the cargo bed C and the current control state, the processing proceeds to step S2. In step S1, in a case where the electronic controller 81*a* determines that the cargo bed C is not attached to the human-powered vehicle 1 in the second control state, the electronic controller 81*a* ends the first control flow.

In step S2, the electronic controller 81*a* switches the second control state to the first control state. After performing the processing of step S2, the electronic controller 81*a* ends the first control flow.

The electronic controller 81*a* executes the first control flow to switch the control state, and thus can appropriately control the transmission device 72 in accordance with the attachment state of the cargo bed C to the human-powered vehicle 1. In a case where the cargo bed C is attached to the human-powered vehicle 1, the electronic controller 81*a* switches the second control state to the first control state by executing the first control flow. When the electronic controller 81*a* switches the second control state to the first control state, the transmission device 72 is controlled in accordance with the traveling state of the human-powered vehicle 1, and the transmission ratio of the human-powered vehicle 1 is automatically changed without the rider operating the operation device 43. When the transmission ratio of the human-powered vehicle 1 is automatically changed without the rider operating the operation device 43, the rider can concentrate on the operation of the handle 42 in a case where the cargo bed C is attached to the human-powered vehicle 1.

Second Embodiment

Figure 6:
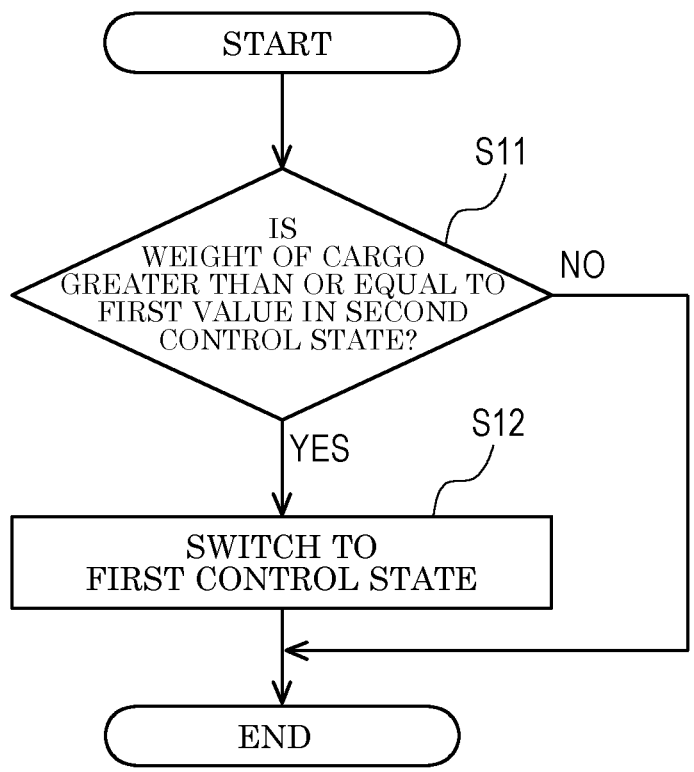
FIG. 6 is a flowchart illustrating a control flow in accordance with a second embodiment.

The control device 81 according to a second embodiment will be described. FIG. 6 is used to describe the control device 81 according to the second embodiment. Components common to those of the first embodiment are denoted by the same reference signs as those of the first embodiment, and redundant description will be omitted.

The electronic controller 81*a* switches one of the first control state or the second control state to the other of the first control state or the second control state in accordance with the weight of the cargo loaded on the human-powered vehicle 1. In the present embodiment, the electronic controller 81*a* switches the second control state to the first control state in a case where the weight of the cargo loaded on the human-powered vehicle 1 is greater than or equal to a first value in the second control state. The first value is stored in the storage 81*b* in advance. The first value is set on the basis of an experiment or the like performed in advance.

An example of control executed by the electronic controller 81*a* will be described. FIG. 6 is used to describe the example of the control executed by the electronic controller 81*a*. The electronic controller 81*a* starts a second control flow according to a flowchart illustrated in FIG. 6 in a case where a first condition set in advance is satisfied. When the second control flow ends, the electronic controller 81*a* repeatedly executes the second control flow at predetermined time intervals until a second condition set in advance is satisfied. The first condition and the second condition are the same as those in the first embodiment.

In step S11, the electronic controller 81*a* determines the weight of the cargo loaded on the human-powered vehicle 1 on the basis of the cargo weight signal output from the cargo weight sensor 82*b*. In step S11, the electronic controller 81*a* acquires the current control state by the same method as in the first embodiment. In step S11, in a case where the electronic controller 81*a* determines that the weight of the cargo loaded on the human-powered vehicle 1 is greater than or equal to the first value on the basis of the detected weight of the cargo loaded on the human-powered vehicle 1 and the current control state in the second control state, the processing proceeds to step S12. In step S11, in a case where the electronic controller 81*a* determines the weight of the cargo loaded on the human-powered vehicle 1 is not greater than or equal to the first value in the second control state, the electronic controller 81*a* ends the second control flow.

In step S12, the electronic controller 81*a* switches the second control state to the first control state. After performing the processing of step S12, the electronic controller 81*a* ends the second control flow.

The electronic controller 81*a* executes the second control flow to switch the control state, and thus can appropriately control the transmission device 72 in accordance with the weight of the cargo loaded on the human-powered vehicle 1. In a case where the weight of the cargo loaded on the human-powered vehicle 1 is greater than or equal to the first value, the electronic controller 81*a* switches the second control state to the first control state by executing the second control flow. When the electronic controller 81*a* switches the second control state to the first control state, the transmission device 72 is controlled in accordance with the traveling state of the human-powered vehicle 1, and the transmission ratio of the human-powered vehicle 1 is automatically changed without the rider operating the operation device 43. When the transmission ratio of the human-powered vehicle 1 is automatically changed without the rider operating the operation device 43, the rider can concentrate on the operation of the handle 42 of the human-powered vehicle 1 in a case where the weight of the cargo loaded on the human-powered vehicle 1 is heavy.

Third Embodiment

Figure 7:
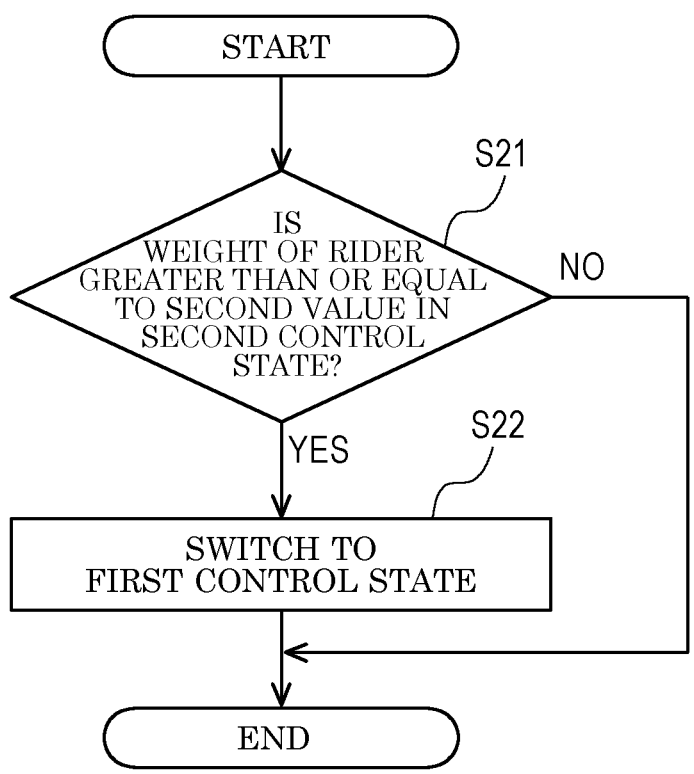
FIG. 7 is a flowchart illustrating a control flow in accordance with a third embodiment.

The control device 81 according to a third embodiment will be described. FIG. 7 is used to describe the control device 81 according to the third embodiment. Components common to those of the first and second embodiments are denoted by the same reference signs as those of the first and second embodiments, and redundant description will be omitted.

The electronic controller 81*a* switches one of the first control state or the second control state to the other of the first control state or the second control state in accordance with the weight of the user riding on the human-powered vehicle 1. In the present embodiment, the electronic controller 81*a* switches the second control state to the first control state in a case where the weight of the user riding on the human-powered vehicle 1 is greater than or equal to a second value in the second control state. The second value is stored in the storage 81*b* in advance. The second value is set on the basis of an experiment or the like performed in advance.

An example of control executed by the electronic controller 81*a* will be described. FIG. 7 is used to describe the example of the control executed by the electronic controller 81*a*. The electronic controller 81*a* starts a third control flow according to a flowchart illustrated in FIG. 7 in a case where a first condition set in advance is satisfied. When the third control flow ends, the electronic controller 81*a* repeatedly executes the third control flow at predetermined time intervals until the second condition set in advance is satisfied. The first condition and the second condition are the same as those in the first embodiment.

In step S21, the electronic controller 81*a* determines the weight of the user riding on the human-powered vehicle 1 on the basis of the user weight signal output from the user weight sensor 82*c*. In step S21, the electronic controller 81*a* acquires the current control state by the same method as in the first embodiment. In step S21, in a case where the electronic controller 81*a* determines the weight of the user riding on the human-powered vehicle 1 is greater than or equal to the second value on the basis of the detected weight of the user riding on the human-powered vehicle 1 and the current control state in the second control state, the processing proceeds to step S22. In step S21, in a case where the electronic controller 81*a* determines the weight of the user riding on the human-powered vehicle 1 is not greater than or equal to the second value in the second control state, the electronic controller ends the third control flow.

In step S22, the electronic controller 81*a* switches the second control state to the first control state. After performing the processing of step S22, the electronic controller 81*a* ends the third control flow.

The electronic controller 81*a* executes the third control flow to switch the control state, and thus can appropriately control the transmission device 72 in accordance with the weight of the user riding on the human-powered vehicle 1. In a case where the weight of the user riding on the human-powered vehicle 1 is greater than or equal to the second value, the electronic controller 81*a* switches the second control state to the first control state by executing the third control flow. When the electronic controller 81*a* switches the second control state to the first control state, the transmission device 72 is controlled in accordance with the traveling state of the human-powered vehicle 1, and the transmission ratio of the human-powered vehicle 1 is automatically changed without the rider operating the operation device 43. When the transmission ratio of the human-powered vehicle 1 is automatically changed without the rider operating the operation device 43, the rider can concentrate on the operation of the handle 42 of the human-powered vehicle 1 in a case where the weight of the user riding on the human-powered vehicle 1 is heavy.

Fourth Embodiment

Figure 8:
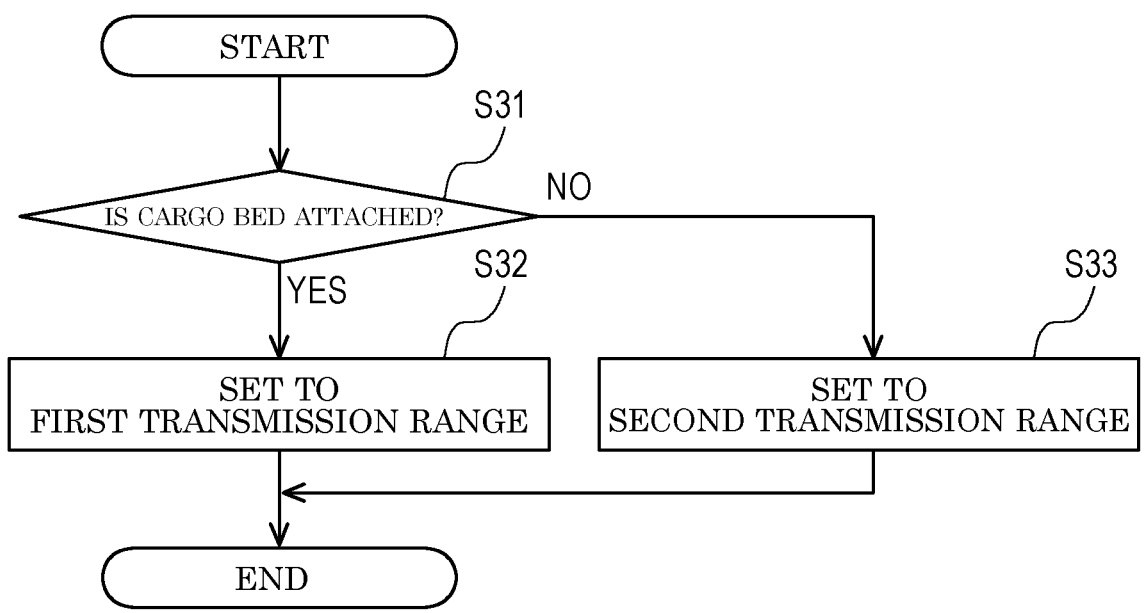
FIG. 8 is a flowchart illustrating a control flow in accordance with a fourth embodiment.

The control device 81 according to a fourth embodiment will be described. FIG. 8 is used to describe the control device 81 according to the fourth embodiment. Components common to those of the first to third embodiments are denoted by the same reference signs as those of the first to third embodiments, and redundant description will be omitted.

The electronic controller 81*a* is configured to control the transmission device 72 provided in the human-powered vehicle 1. The electronic controller 81*a* is configured to change the transmission range of the transmission device 72. In the present embodiment, the transmission range of the transmission device 72 is a range of a transmission stage in which the transmission device 72 can perform transmission. The transmission range of the transmission device 72 can be a range of a transmission ratio in which the transmission device 72 can perform transmission. The transmission range of the transmission device 72 includes a plurality of transmission ranges. In the present embodiment, the transmission range of the transmission device 72 includes a first transmission range and a second transmission range. The first transmission range and the second transmission range are different from each other in at least some parameters among parameters including a minimum transmission ratio, a maximum transmission ratio, and a width of the transmission range. The storage 81*b* stores the first transmission range and the second transmission range. Table 1 shows an example of the first transmission range and the second transmission range stored in the storage 81*b*.

TABLE 1

|  | 1st | 2nd | 3rd | ... | 10th | 11th | 12th |
|---|---|---|---|---|---|---|---|
| First Transmission Range | ○ | ○ | ○ |  | ○ |  |  |
| Second Transmission Range |  | ○ | ○ |  | ○ | ○ | ○ |

The transmission stage shown in Table 1 corresponds to the rear sprocket engaged with the chain 53. In a case where the first rotating body 51 includes one front sprocket and the second rotating body 52 includes a plurality of rear sprockets, the transmission stage indicates a combination of the front sprocket and the rear sprocket engaged with the chain 53. In Table 1, as the number of the transmission stage increases, the number of teeth of the rear sprocket engaged with the chain 53 decreases. In Table 1, as the number of the transmission stage increases, the transmission ratio of the human-powered vehicle 1 increases. Table 1 shows that the transmission stage indicated by ○ is included in the transmission range. The width of the transmission range in Table 1 corresponds to the number of the transmission stage indicated by ○. The width of the transmission range can be a difference between the minimum transmission ratio and the maximum transmission ratio in the transmission range, instead of the number of the transmission stage indicated by ○.

The first transmission range is a range from a first transmission stage 1st to a tenth transmission stage 10th. The first transmission range is set on the basis of an experiment or the like performed in advance. The second transmission range is a range from a second transmission stage 2nd to a twelfth transmission stage 12th. The second transmission range is set on the basis of an experiment or the like performed in advance.

The electronic controller 81*a* is configured to set the transmission range of the transmission device 72 to the first transmission range or the second transmission range. The electronic controller 81*a* is configured to change the transmission stage of the transmission device 72 on the basis of one set transmission range of the first transmission range or the second transmission range.

In a case where the electronic controller 81*a* controls the transmission device 72 on the basis of the first transmission range and increases the transmission ratio in accordance with the reference value of the human-powered vehicle 1, the electronic controller 81*a* controls the transmission device 72 such that the transmission stage of the human-powered vehicle 1 gradually increases in the range from the first transmission stage 1st to the tenth transmission stage 10th. In a case where the electronic controller 81a controls the transmission device 72 on the basis of the first transmission range and decreases the transmission ratio in accordance with the reference value of the human-powered vehicle 1, the electronic controller 81a controls the transmission device 72 such that the transmission stage of the human-powered vehicle 1 gradually decreases in the range from the tenth transmission stage 10th to the first transmission stage 1st.

In a case where the electronic controller 81a controls the transmission device 72 on the basis of the second transmission range and increases the transmission ratio in accordance with the reference value of the human-powered vehicle 1, the electronic controller 81a controls the transmission device 72 such that the transmission stage of the human-powered vehicle 1 gradually increases in the range from the second transmission stage 2nd to the twelfth transmission stage 12th. In a case where the electronic controller 81a controls the transmission device 72 on the basis of the second transmission range and decreases the transmission ratio in accordance with the reference value of the human-powered vehicle 1, the electronic controller 81a controls the transmission device 72 such that the transmission stage of the human-powered vehicle 1 gradually decreases in the range from the twelfth transmission stage 12th to the second transmission stage 2nd.

The electronic controller 81a changes a transmission range of the transmission device 72 in accordance with at least one of the attachment state of the cargo bed C to the human-powered vehicle 1, the weight of the cargo loaded on the human-powered vehicle 1, or the weight of the user riding on the human-powered vehicle 1. In the present embodiment, the electronic controller 81a sets the transmission range of the transmission device 72 in accordance with the attachment state of the cargo bed C to the human-powered vehicle 1. An example of control executed by the electronic controller 81a will be described. FIG. 8 is used to describe the example of the control executed by the electronic controller 81a.

The electronic controller 81a starts a fourth control flow according to a flowchart illustrated in FIG. 8 in a case where a first condition set in advance is satisfied. When the fourth control flow ends, the electronic controller 81a repeatedly executes the fourth control flow at predetermined time intervals until the second condition set in advance is satisfied. The first condition and the second condition are the same as those in the first embodiment.

In step S31, in a case where the electronic controller 81a determines the cargo bed C is attached to the human-powered vehicle 1, the processing proceeds to step S32. In step S31, in a case where the electronic controller 81a determines the cargo bed C is not attached to the human-powered vehicle 1, the processing proceeds to step S33.

In step S32, the electronic controller 81a sets the transmission range of the transmission device 72 to the first transmission range. After performing the processing of step S32, the electronic controller 81a ends the fourth control flow.

In step S33, the electronic controller 81a sets the transmission range of the transmission device 72 to the second transmission range. After performing the processing of step S33, the electronic controller 81a ends the fourth control flow.

The electronic controller 81a executes the fourth control flow to set the transmission range of the transmission device 72, and thus can appropriately control the transmission device 72 in accordance with the attachment state of the cargo bed C to the human-powered vehicle 1. A minimum transmission ratio in the transmission range in a case where the cargo bed C is attached to the human-powered vehicle 1 is smaller than a minimum transmission ratio in the transmission range in a case where the cargo bed C is not attached to the human-powered vehicle 1. In the present embodiment, a minimum transmission ratio in the first transmission range in a case where the cargo bed C is attached to the human-powered vehicle 1 is smaller than a minimum transmission ratio in the second transmission range in a case where the cargo bed C is not attached to the human-powered vehicle 1. Since the minimum transmission ratio in the first transmission range is smaller than the minimum transmission ratio in the second transmission range, the transmission ratio of the human-powered vehicle 1 can be further reduced in a case where the cargo bed C is attached to the human-powered vehicle 1. Since the transmission ratio of the human-powered vehicle 1 can be further reduced, the rider can cause the human-powered vehicle 1 to travel while suppressing an increase in the human force torque, for example, in a case where a heavy cargo is loaded on the cargo bed C. Therefore, traveling comfort and stability of the human-powered vehicle 1 are improved.

A maximum transmission ratio in the transmission range in a case where the cargo bed C is attached to the human-powered vehicle 1 is smaller than a maximum transmission ratio in the transmission range in a case where the cargo bed C is not attached to the human-powered vehicle 1. In the present embodiment, a maximum transmission ratio in the first transmission range in a case where the cargo bed C is attached to the human-powered vehicle 1 is smaller than a maximum transmission ratio in the second transmission range in a case where the cargo bed C is not attached to the human-powered vehicle 1. Since the maximum transmission ratio in the first transmission range is smaller than the maximum transmission ratio in the second transmission range, the maximum transmission ratio can be suppressed in a case where the cargo bed C is attached to the human-powered vehicle 1. Since the increase in the traveling speed of the human-powered vehicle 1 to which the cargo bed C is attached can be suppressed by suppressing the maximum transmission ratio, the traveling comfort and stability of the human-powered vehicle 1 are improved.

The transmission range in the case where the cargo bed C is attached to the human-powered vehicle 1 is narrower than the transmission range in the case where the cargo bed C is not attached to the human-powered vehicle 1. In the present embodiment, the first transmission range in the case where the cargo bed C is attached to the human-powered vehicle 1 is narrower than the second transmission range in the case where the cargo bed C is not attached to the human-powered vehicle 1. Since the first transmission range is narrower than the second transmission range, the transmission range of the transmission device 72 is narrowed in a case where the cargo bed C is attached to the human-powered vehicle 1, and the human-powered vehicle 1 can travel at a stable traveling speed. Therefore, the traveling comfort and stability of the human-powered vehicle 1 are improved.

Fifth Embodiment

Figure 9:
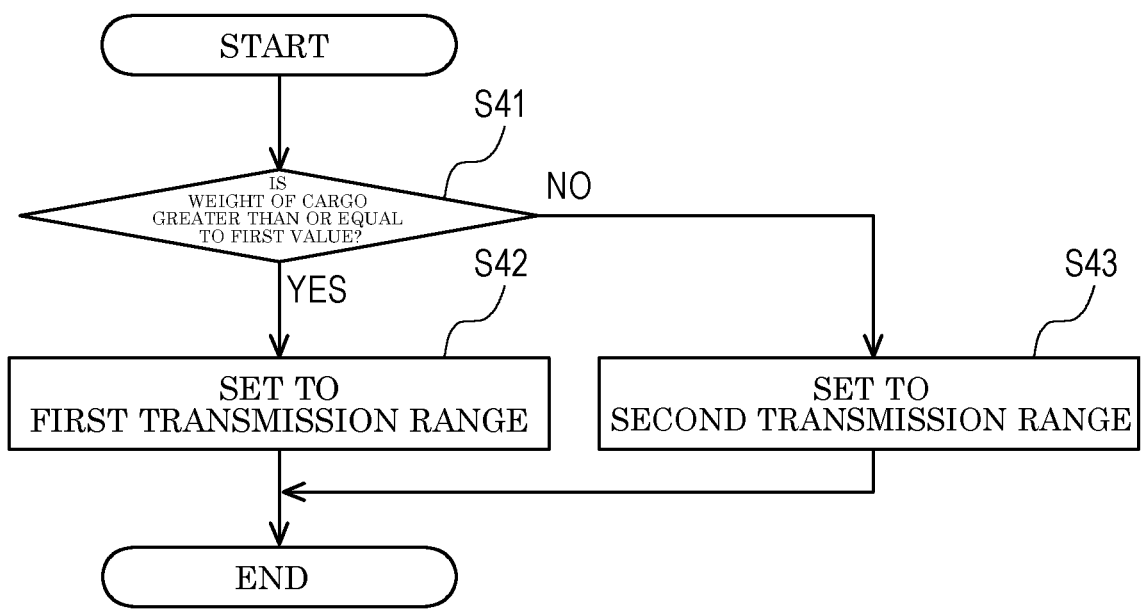
FIG. 9 is a flowchart illustrating a control flow in accordance with a fifth embodiment.

The control device 81 according to a fifth embodiment will be described. FIG. 9 is used to describe the control device 81 according to the fifth embodiment. Components common to those of the first to fourth embodiments are denoted by the same reference signs as those of the first to fourth embodiments, and redundant description will be omitted.

The transmission range of the transmission device 72 includes a first transmission range and a second transmission range. The transmission range of the transmission device 72 can include a third transmission range different from the first transmission range and a fourth transmission range different from the second transmission range.

The electronic controller 81*a* sets the transmission range of the transmission device 72 in accordance with the weight of the cargo loaded on the human-powered vehicle 1. An example of control executed by the electronic controller 81*a* will be described. FIG. 9 is used to describe the example of the control executed by the electronic controller 81*a*.

The electronic controller 81*a* starts a fifth control flow according to a flowchart illustrated in FIG. 9 in a case where a first condition set in advance is satisfied. When the fifth control flow ends, the electronic controller 81*a* repeatedly executes the fifth control flow at predetermined time intervals until the second condition set in advance is satisfied. The first condition and the second condition are the same as those in the first embodiment.

In step S41, in a case where the electronic controller 81*a* determines the cargo loaded on the human-powered vehicle 1 is greater than or equal to the first value, the processing proceeds to step S42. In step S41, in a case where the electronic controller 81*a* determines the cargo loaded on the human-powered vehicle 1 is not smaller than the first value, the processing proceeds to step S43.

In step S42, the electronic controller 81*a* sets the transmission range of the transmission device 72 to the first transmission range. After performing the processing of step S42, the electronic controller 81*a* ends the fifth control flow.

In step S43, the electronic controller 81*a* sets the transmission range of the transmission device 72 to the second transmission range. After performing the processing of step S43, the electronic controller 81*a* ends the fifth control flow.

The electronic controller 81*a* executes the fifth control flow to set the transmission range of the transmission device 72, and thus can appropriately control the transmission device 72 in accordance with the weight of the cargo loaded on the human-powered vehicle 1. A minimum transmission ratio in the transmission range in a case where the weight of the cargo loaded on the human-powered vehicle 1 is greater than or equal to a first value is smaller than a minimum transmission ratio in the transmission range in a case where the weight of the cargo loaded on the human-powered vehicle 1 is smaller than the first value. In the present embodiment, a minimum transmission ratio in the first transmission range in a case where the weight of the cargo loaded on the human-powered vehicle 1 is greater than or equal to a first value is smaller than a minimum transmission ratio in the second transmission range in a case where the weight of the cargo loaded on the human-powered vehicle 1 is smaller than the first value. Since the minimum transmission ratio in the first transmission range is smaller than the minimum transmission ratio in the second transmission range, the transmission ratio of the human-powered vehicle 1 can be further reduced in a case where the weight of the cargo loaded on the human-powered vehicle 1 is greater than or equal to the first value. Since the transmission ratio of the human-powered vehicle 1 can be further reduced, the rider can cause the human-powered vehicle 1 to travel while suppressing an increase in the human force torque, for example, in a case where a heavy cargo is loaded on the cargo bed C. Therefore, traveling comfort and stability of the human-powered vehicle 1 are improved.

A maximum transmission ratio in the transmission range in a case where the weight of the cargo loaded on the human-powered vehicle 1 is greater than or equal to a first value is smaller than a maximum transmission ratio in the transmission range in a case where the weight of the cargo loaded on the human-powered vehicle 1 is smaller than the first value. In the present embodiment, a maximum transmission ratio in the first transmission range in a case where the weight of the cargo loaded on the human-powered vehicle 1 is greater than or equal to a first value is smaller than a maximum transmission ratio in the second transmission range in a case where the weight of the cargo loaded on the human-powered vehicle 1 is smaller than the first value. Since the maximum transmission ratio in the first transmission range is smaller than the maximum transmission ratio in the second transmission range, the maximum transmission ratio can be suppressed in a case where the weight of the cargo loaded on the human-powered vehicle 1 is greater than or equal to the first value. Since the increase in the traveling speed of the human-powered vehicle 1 on which a heavy cargo is loaded, for example, can be suppressed by suppressing the maximum transmission ratio, the traveling comfort and stability of the human-powered vehicle 1 are improved.

The transmission range in the case where the weight of the cargo loaded on the human-powered vehicle 1 is greater than or equal to the first value is narrower than the transmission range in the case where the weight of the cargo loaded on the human-powered vehicle 1 is smaller than the first value. In the present embodiment, the first transmission range in the case where the weight of the cargo loaded on the human-powered vehicle 1 is greater than or equal to the first value is narrower than the second transmission range in the case where the weight of the cargo loaded on the human-powered vehicle 1 is smaller than the first value. Since the first transmission range is narrower than the second transmission range, the transmission range of the transmission device 72 is narrowed in a case where the weight of the cargo loaded on the human-powered vehicle 1 is heavy, and the human-powered vehicle 1 can travel at a stable traveling speed. Therefore, the traveling comfort and stability of the human-powered vehicle 1 are improved.

Sixth Embodiment

Figure 10:
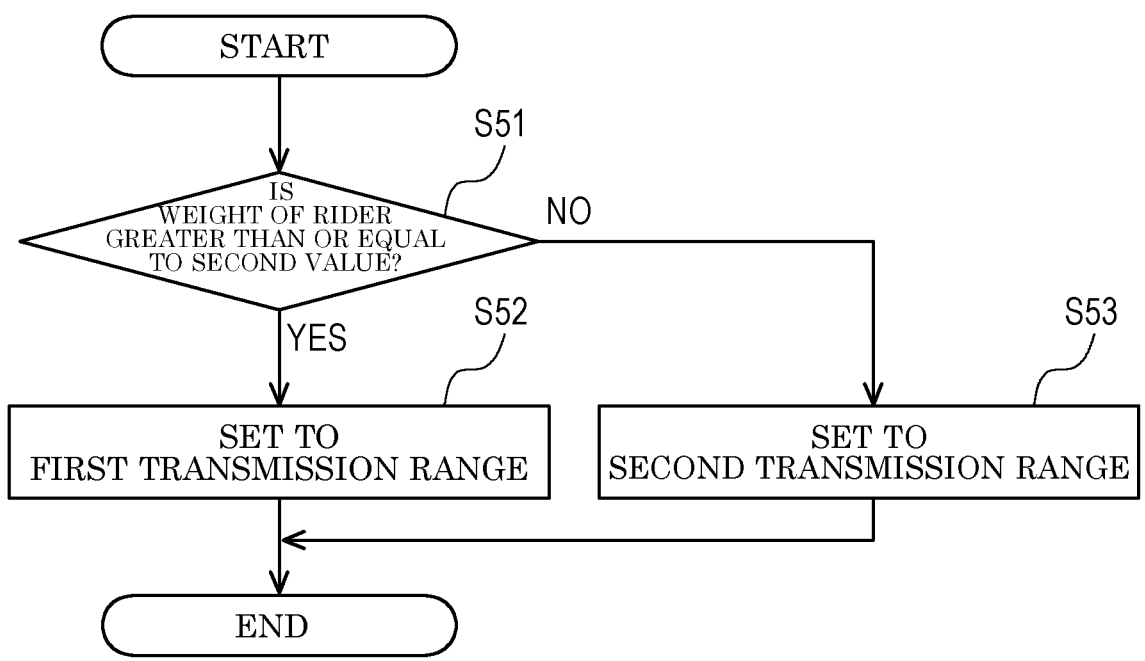
FIG. 10 is a flowchart illustrating a control flow in accordance with a sixth embodiment.

The control device 81 according to a sixth embodiment will be described. FIG. 10 is used to describe the control device 81 according to the sixth embodiment. Components common to those of the first to fifth embodiments are denoted by the same reference signs as those of the first to fifth embodiments, and redundant description will be omitted.

The transmission range of the transmission device 72 includes a first transmission range and a second transmission range. The transmission range of the transmission device 72 can include a fifth transmission range different from the first transmission range and a sixth transmission range different from the second transmission range.

The electronic controller 81*a* sets the transmission range of the transmission device 72 in accordance with the weight of the user riding on the human-powered vehicle 1. An example of control executed by the electronic controller 81*a* will be described. FIG. 10 is used to describe the example of the control executed by the electronic controller 81*a*.

The electronic controller 81a starts a sixth control flow according to a flowchart illustrated in FIG. 10 in a case where a first condition set in advance is satisfied. When the sixth control flow ends, the electronic controller 81a repeatedly executes the sixth control flow at predetermined time intervals until the second condition set in advance is satisfied. The first condition and the second condition are the same as those in the first embodiment.

In step S51, in a case where the electronic controller 81a determines the user riding on the human-powered vehicle 1 is greater than or equal to the second value, the processing proceeds to step S52. In step S51, in a case where the electronic controller 81a determines the user riding on the human-powered vehicle 1 is not smaller than the second value, the processing proceeds to step S53.

In step S52, the electronic controller 81a sets the transmission range of the transmission device 72 to the first transmission range. After performing the processing of step S52, the electronic controller 81a ends the sixth control flow.

In step S53, the electronic controller 81a sets the transmission range of the transmission device 72 to the second transmission range. After performing the processing of step S53, the electronic controller 81a ends the sixth control flow.

The electronic controller 81a executes the sixth control flow to set the transmission range of the transmission device 72, and thus can appropriately control the transmission device 72 in accordance with the weight of the user riding on the human-powered vehicle 1. A minimum transmission ratio in the transmission range in a case where the weight of the user riding on the human-powered vehicle 1 is greater than or equal to a second value is smaller than a minimum transmission ratio in the transmission range in a case where the weight of the user riding on the human-powered vehicle 1 is smaller than the second value. In the present embodiment, a minimum transmission ratio in the first transmission range in a case where the weight of the user riding on the human-powered vehicle 1 is greater than or equal to a second value is smaller than a minimum transmission ratio in the second transmission range in a case where the weight of the user riding on the human-powered vehicle 1 is smaller than the second value. Since the minimum transmission ratio in the first transmission range is smaller than the minimum transmission ratio in the second transmission range, the transmission ratio of the human-powered vehicle 1 can be further reduced in a case where the weight of the user riding on the human-powered vehicle 1 is greater than or equal to the second value. Since the transmission ratio of the human-powered vehicle 1 can be further reduced, the rider can cause the human-powered vehicle 1 to travel while suppressing an increase in the human force torque, for example, in a case where a heavy user is riding on the human-powered vehicle 1. Therefore, the traveling comfort and stability of the human-powered vehicle 1 are improved.

A maximum transmission ratio in the transmission range in a case where the weight of the user riding on the human-powered vehicle 1 is greater than or equal to a second value is smaller than a maximum transmission ratio in the transmission range in a case where the weight of the user riding on the human-powered vehicle 1 is smaller than the second value. In the present embodiment, a maximum transmission ratio in the first transmission range in a case where the weight of the user riding on the human-powered vehicle 1 is greater than or equal to a second value is smaller than a maximum transmission ratio in the second transmission range in a case where the weight of the user riding on the human-powered vehicle 1 is smaller than the second value. Since the maximum transmission ratio in the first transmission range is smaller than the maximum transmission ratio in the second transmission range, the maximum transmission ratio can be suppressed in a case where the weight of the user riding on the human-powered vehicle 1 is greater than or equal to the second value. Since the increase in the traveling speed of the human-powered vehicle 1 on which a heavy user is riding, for example, can be suppressed by suppressing the maximum transmission ratio, the traveling stability of the human-powered vehicle 1 is improved.

The transmission range in the case where the weight of the user riding on the human-powered vehicle 1 is greater than or equal to the second value is narrower than the transmission range in the case where the weight of the user riding on the human-powered vehicle 1 is smaller than the second value. In the present embodiment, the first transmission range in the case where the weight of the user riding on the human-powered vehicle 1 is greater than or equal to the second value is narrower than the second transmission range in the case where the weight of the user riding on the human-powered vehicle 1 is smaller than the second value. Since the first transmission range is narrower than the second transmission range, the transmission range of the transmission device 72 is narrowed in a case where the weight of the user riding on the human-powered vehicle 1 is light, and the human-powered vehicle 1 can travel at a stable traveling speed. Therefore, the traveling comfort and stability of the human-powered vehicle 1 are improved.

MODIFICATIONS

The description about each embodiment exemplifies possible forms that can be taken by the control device 81 and the control system 80 according to the present invention, and is not intended to limit the present invention. The control device 81 and the control system 80 according to the present invention can take a form in which, for example, the following modifications of the embodiments and at least two modifications that do not contradict each other are combined.

For example, the configuration of the human-powered vehicle 1 according to each embodiment is an example. The human-powered vehicle 1 can include various devices not illustrated in each embodiment, and do not have to include some of the various devices illustrated in each embodiment. In each embodiment, the rear derailleur 72a is illustrated as the transmission device 72, but the transmission device 72 can include a configuration other than a derailleur. For example, the transmission device 72 can include an internal transmission device. For example, in a case where the transmission device 72 includes an internal transmission instead of the external transmission, in the first embodiment, the cargo bed C is attached to the human-powered vehicle 1 in a state where the human-powered vehicle 1 is stopped, and when the second control state is switched to the first control state, the electronic controller 81a operates the transmission device 72 so as to achieve the transmission ratio corresponding to the reference value in a case where the human-powered vehicle 1 is stopped.

The configurations exemplified in each embodiment can be combined with each other within a range not contradictory to each other. The processing contents and the processing order of the flowcharts exemplified in each embodiment are merely examples, and the processing contents and the processing order can be appropriately changed within the scope of the present invention.

For example, the first control flow illustrated in FIG. 5, the second control flow illustrated in FIG. 6, and the third control flow illustrated in FIG. 7 can be combined with each other. In a case where the first control flow, the second control flow, and the third control flow are combined with each other, the electronic controller 81a can switch the second control state to the first control state, for example, in at least one of a case where the cargo bed C is attached in the second control state, a case where the weight of the cargo is greater than or equal to the first value in the second control state, or a case where the weight of the user is greater than or equal to the second value in the second control state.

The fourth control flow illustrated in FIG. 8, the fifth control flow illustrated in FIG. 9, and the sixth control flow illustrated in FIG. 10 can be combined with each other. In a case where the fourth control flow, the fifth control flow, and the sixth control flow are combined with each other, the electronic controller 81a can set the transmission range of the transmission device 72 to the first transmission range, for example, in at least one of a case where the cargo bed C is attached, a case where the weight of the cargo is greater than or equal to the first value, or a case where the weight of the user is greater than or equal to the second value.

Various thresholds used in the control exemplified in each embodiment are not limited, and can be arbitrarily set. Various thresholds can be arbitrarily changed by an operation of the operation device 43 or the like.

The transmission range exemplified in the fourth to sixth embodiments is an example, and the specific content of the transmission range is not limited. For example, the transmission range can be arbitrarily changed depending on the number and the number teeth of rear sprockets and front sprockets. For example, in the first transmission range and the second transmission range in the fourth embodiment, the minimum transmission ratios are different from each other, but the maximum transmission ratios can be the same.

The electronic controller 81a can change a parameter different from the transmission range and the control state of the transmission device 72. For example, the electronic controller 81a can change the transmission threshold T used when changing the transmission ratio of the human-powered vehicle 1 in the first control state. For example, in at least one of a case where the cargo bed C is attached to the human-powered vehicle 1, a case where the weight of the cargo loaded on the human-powered vehicle 1 is greater than or equal to the first value, or a case where the weight of the user riding on the human-powered vehicle 1 is greater than or equal to the second value, the electronic controller 81a can change the second transmission threshold T2 such that the second transmission threshold T2 illustrated in FIG. 4 approaches the first transmission threshold T1. In the present embodiment, the electronic controller 81a can change the second transmission threshold T2 to be a threshold T3 that is greater than the second transmission threshold T2 and smaller than the first transmission threshold T1.

The expression "at least one" as used herein means "one or more" of the desired options. As an example, the expression "at least one" as used herein means "only one option" or "both of two options" if the number of options is two. As another example, the expression "at least one" as used herein means "only one option" or "a combination of two or more arbitrary options" if the number of options is three or more.

What is claimed is:

1. A control device for a human-powered vehicle, the control device comprising:
an electronic controller configured to control a transmission device provided to the human-powered vehicle,
the transmission device including at least one of a front derailleur and a rear derailleur,
the electronic controller being configured to change a range of a transmission stage from one of a first transmission range and a second transmission range to another of the first transmission range and the second transmission range in accordance with at least one of an attachment state of a cargo bed to the human-powered vehicle, a weight of a cargo loaded on the human-powered vehicle, or a weight of a user riding on the human-powered vehicle, and
the first transmission range and the second transmission range being different from each other in a minimum transmission ratio.

2. A control device for a human-powered vehicle, the control device comprising:
an electronic controller configured to control a transmission device provided to the human-powered vehicle in a plurality of control states,
the transmission device including at least one of a front derailleur and a rear derailleur,
the plurality of control states includes a first control state in which the transmission device is automatically controlled in accordance with a traveling state of the human-powered vehicle and a second control state in which the transmission device is controlled in accordance with an operation of an operation device provided in the human-powered vehicle, and
the electronic controller being configured to switch one of the first control state or the second control state to another of the first control state or the second control state in accordance with an attachment state of a cargo bed to the human-powered vehicle.

3. The control device according to claim 2, wherein
the electronic controller is configured to switch the second control state to the first control state in a case where the cargo bed is attached to the human-powered vehicle in the second control state.

4. A control device for a human-powered vehicle, the control device comprising:
an electronic controller configured to control a transmission device provided to the human-powered vehicle in a plurality of control states,
the plurality of control states includes a first control state in which the transmission device is controlled in accordance with a traveling state of the human-powered vehicle and a second control state in which the transmission device is controlled in accordance with an operation of an operation device provided in the human-powered vehicle, and
the electronic controller being configured to switch one of the first control state or the second control state to another of the first control state or the second control state in accordance with at least one of an attachment state of a cargo bed to the human-powered vehicle, a weight of a cargo loaded on the human-powered vehicle, or a weight of a user riding on the human-powered vehicle, the electronic controller being configured to switch the second control state to the first control state in a case where the weight of the cargo loaded on the human-powered vehicle is greater than or equal to a first value in the second control state.

5. A control device for a human-powered vehicle, the control device comprising:
an electronic controller configured to control a transmission device provided to the human-powered vehicle in a plurality of control states,
the plurality of control states includes a first control state in which the transmission device is controlled in accordance with a traveling state of the human-powered vehicle and a second control state in which the transmission device is controlled in accordance with an operation of an operation device provided in the human-powered vehicle, and the electronic controller being configured to switch one of the first control state or the second control state to another of the first control state or the second control state in accordance with at least one of an attachment state of a cargo bed to the human-powered vehicle, a weight of a cargo loaded on the human-powered vehicle, or a weight of a user riding on the human-powered vehicle, the electronic controller being configured to switch the second control state to the first control state in a case where the weight of the user riding on the human-powered vehicle is greater than or equal to a value in the second control state.

6. The control device according to claim 2, wherein the electronic controller is configured to change a transmission range of the transmission device in accordance with the attachment state of the cargo bed to the human-powered vehicle.

7. A control device for a human-powered vehicle, the control device comprising:

an electronic controller configured to control a transmission device provided to the human-powered vehicle, the transmission device including at least one of a front derailleur or a rear derailleur, the electronic controller being configured to change a transmission range of the transmission device from one of a first transmission range and a second transmission range to another of the first transmission range and the second transmission range in accordance with at least one of an attachment state of a cargo bed to the human-powered vehicle, a weight of a cargo loaded on the human-powered vehicle, or a weight of a user riding on the human-powered vehicle, the first transmission range and the second transmission range being different from each other in a minimum transmission ratio, and the minimum transmission ratio in the transmission range in a case where the cargo bed is attached to the human-powered vehicle being smaller than the minimum transmission ratio in the transmission range in a case where the cargo bed is not attached to the human-powered vehicle.

8. A control device for a human-powered vehicle, the control device comprising:

an electronic controller configured to control a transmission device provided to the human-powered vehicle, the electronic controller being configured to change a transmission range of the transmission device in accordance with at least one of an attachment state of a cargo bed to the human-powered vehicle, a weight of a cargo loaded on the human-powered vehicle, or a weight of a user riding on the human-powered vehicle, a maximum transmission ratio in the transmission range in a case where the cargo bed is attached to the human-powered vehicle being smaller than a maximum transmission ratio in the transmission range in a case where the cargo bed is not attached to the human-powered vehicle.

9. A control device for a human-powered vehicle, the control device comprising:

an electronic controller configured to control a transmission device provided to the human-powered vehicle, the transmission device including at least one of a front derailleur or a rear derailleur, the electronic controller being configured to change a transmission range of the transmission device from one of a first transmission range or a second transmission range to another of the first transmission range or the second transmission range in accordance with at least one of an attachment state of a cargo bed to the human-powered vehicle, a weight of a cargo loaded on the human-powered vehicle, or a weight of a user riding on the human-powered vehicle, the first transmission range and the second transmission range are different from each other in a minimum transmission ratio, and the transmission range in a case where the cargo bed is attached to the human-powered vehicle being narrower than the transmission range in a case where the cargo bed is not attached to the human-powered vehicle.

10. A control device for a human-powered vehicle, the control device comprising:

an electronic controller configured to control a transmission device provided to the human-powered vehicle, the transmission device including at least one of a front derailleur or a rear derailleur, the electronic controller being configured to change a transmission range of the transmission device from one of a first transmission range or a second transmission range to another of the first transmission range or the second transmission range in accordance with at least one of an aattachment state of a cargo bed to the human-powered vehicle, a weight of a cargo loaded on the human-powered vehicle, or a weight of a user riding on the human-powered vehicle, the first transmission range and the second transmission range are different from each other in a minimum transmission ratio, and the minimum transmission ratio in the transmission range in a case where the weight of the cargo loaded on the human-powered vehicle being greater than or equal to a first value is smaller than the minimum transmission ratio in the transmission range in a case where the weight of the cargo loaded on the human-powered vehicle is smaller than the first value.

11. A control device for a human-powered vehicle, the control device comprising:

an electronic controller configured to control a transmission device provided to the human-powered vehicle, the electronic controller being configured to change a transmission range of the transmission device in accordance with at least one of an attachment state of a cargo bed to the human-powered vehicle, a weight of a cargo loaded on the human-powered vehicle, or a weight of a user riding on the human-powered vehicle, a maximum transmission ratio in the transmission range in a case where the weight of the cargo loaded on the human-powered vehicle is greater than or equal to a first value being smaller than a maximum transmission ratio in the transmission range in a case where the weight of the cargo loaded on the human-powered vehicle is smaller than the first value.

12. A control device for a human-powered vehicle, the control device comprising:

an electronic controller configured to control a transmission device provided to the human-powered vehicle, the transmission device including at least one of a front derailleur or a rear derailleur, the electronic controller being configured to change a transmission range of the transmission device from one of a first transmission range or a second transmission range to another of the first transmission range or the second transmission range in accordance with at least one of an attachment state of a cargo bed to the human-powered vehicle, a weight of a cargo loaded on the human-powered vehicle, or a weight of a user riding on the human-powered vehicle, the first transmission range and the second transmission range are different from each other in a minimum transmission ratio, and the transmission range in a case where the weight of the cargo loaded on the human-powered vehicle is greater than or equal to a first value being narrower than the transmission range in a case where the weight of the cargo loaded on the human-powered vehicle is smaller than the first value.

13. A control device for a human-powered vehicle, the control device comprising:

an electronic controller configured to control a transmission device provided to the human-powered vehicle, the transmission device including at least one of a front derailleur or a rear derailleur, the electronic controller being configured to change a transmission range of the transmission device from one of a first transmission range or a second transmission range to another of the first transmission range or the second transmission range in accordance with at least one of an at state of a cargo bed to the human-powered vehicle, a weight of a cargo loaded on the human-powered vehicle, or a weight of a user riding on the human-powered vehicle, the first transmission range and the second transmission range are different from each other in a minimum transmission ratio, and the minimum transmission ratio in the transmission range in a case where the weight of the user riding on the human-powered vehicle is greater than or equal to a value being smaller than the minimum transmission ratio in the transmission range in a case where the weight of the user riding on the human-powered vehicle is smaller than the value.

14. A control device for a human-powered vehicle, the control device comprising:

an electronic controller configured to control a transmission device provided to the human-powered vehicle, the electronic controller being configured to change a transmission range of the transmission device in accordance with at least one of an attachment state of a cargo bed to the human-powered vehicle, a weight of a cargo loaded on the human-powered vehicle, or a weight of a user riding on the human-powered vehicle, a maximum transmission ratio in the transmission range in a case where the weight of the user riding on the human-powered vehicle is greater than or equal to a value being smaller than a maximum transmission ratio in the transmission range in a case where the weight of the user riding on the human-powered vehicle is smaller than the value.

15. A control device for a human-powered vehicle, the control device comprising:

an electronic controller configured to control a transmission device provided to the human-powered vehicle, the transmission device including at least one of a front derailleur or a rear derailleur, the electronic controller being configured to change a transmission range of the transmission device from one of a first transmission range or a second transmission range to another of the first transmission range or the second transmission range in accordance with at least one of an at state of a cargo bed to the human-powered vehicle, a weight of a cargo loaded on the human-powered vehicle, or a weight of a user riding on the human-powered vehicle, the first transmission range and the second transmission range are different from each other in a minimum transmission ratio, and the transmission range in a case where the weight of the user riding on the human-powered vehicle is greater than or equal to a value being narrower than the transmission range in a case where the weight of the user riding on the human-powered vehicle is smaller than the value.

16. A control system comprising the control device according to claim 1, and the control system further comprising:

a sensor configured to detect at least one of the attachment state of the cargo bed to the human-powered vehicle, the weight of the cargo loaded on the human-powered vehicle, or the weight of the user riding on the human-powered vehicle.

* * * * *